United States Patent [19]

Shirota

[11] Patent Number: 5,000,341
[45] Date of Patent: Mar. 19, 1991

[54] CONTAINER WITH ABSORBENT INTERIOR

[76] Inventor: Kohji Shirota, 528-1 Nakano, Fuji City, Shizuoka, Japan

[21] Appl. No.: 371,463

[22] Filed: Jun. 26, 1989

[51] Int. Cl.[5] ............................................. B65D 90/04
[52] U.S. Cl. .................................... 220/452; 220/573; 99/425; 99/445; 184/106; 126/51
[58] Field of Search ............... 220/452, 463, 441, 1 S, 220/88 R; 99/425, 444–446; 184/106; 126/51; 210/502.1

[56] References Cited

U.S. PATENT DOCUMENTS

| | | | |
|---|---|---|---|
| 966,968 | 8/1910 | Watson | 220/88 R |
| 1,094,210 | 4/1914 | Hughes | 184/106 |
| 2,159,053 | 5/1939 | Saborsky | 220/452 X |
| 2,305,923 | 12/1942 | Held | 220/88 R |
| 2,395,449 | 2/1946 | Briggs | 210/502 |
| 3,127,828 | 4/1964 | Fine | 99/446 |
| 3,141,522 | 7/1964 | Fitzpatrick . | |
| 3,228,491 | 1/1966 | Gatsos . | |
| 3,354,989 | 11/1987 | Anderson | 184/106 |
| 3,561,639 | 2/1971 | Allen | 220/88 R |
| 3,691,620 | 9/1972 | Harr | 220/88 R X |
| 3,697,029 | 10/1972 | Lauffer | 220/441 X |
| 3,770,575 | 11/1973 | Ball . | |
| 3,855,152 | 12/1974 | Preus . | |
| 3,997,073 | 12/1976 | Morris | 206/557 |
| 4,013,190 | 3/1977 | Wiggins et al. | 220/88 R X |
| 4,071,921 | 2/1978 | Jury | 206/278 |
| 4,098,398 | 7/1978 | Meyers . | |
| 4,206,080 | 6/1980 | Sato et al. . | |
| 4,332,854 | 6/1982 | Parker . | |
| 4,340,486 | 7/1982 | Swanson . | |
| 4,343,680 | 8/1982 | Field et al. . | |
| 4,360,046 | 11/1982 | Streit et al. | 220/263 |
| 4,395,336 | 7/1983 | Eng . | |
| 4,401,475 | 8/1983 | Eriksson . | |
| 4,439,324 | 3/1984 | Crotti . | |
| 4,497,147 | 2/1985 | Clapper . | |
| 4,497,688 | 2/1985 | Schaefer . | |
| 4,497,712 | 2/1985 | Cowling . | |
| 4,502,305 | 2/1985 | Zola et al. . | |
| 4,555,339 | 11/1985 | Graves et al. | 220/4 D |
| 4,579,155 | 4/1986 | Zola . | |
| 4,750,631 | 6/1988 | Hastings et al. | 220/88 R X |
| 4,791,883 | 12/1988 | Lehman et al. | 229/146 |
| 4,801,005 | 1/1989 | Hahn et al. . | |

FOREIGN PATENT DOCUMENTS

| | | | |
|---|---|---|---|
| 58-199041 | 11/1983 | Japan . | |
| 338394 | 6/1959 | Switzerland | 220/441 |
| 781080 | 8/1957 | United Kingdom | 220/441 |
| 2069361 | 8/1981 | United Kingdom . | |
| 2071076 | 9/1981 | United Kingdom . | |

Primary Examiner—Stephen Marcus
Assistant Examiner—Nova Stucker
Attorney, Agent, or Firm—Pennie & Edmonds

[57] ABSTRACT

A container for the storage and disposal of liquids, such as liquid fats, oils and suspended greases, comprising a receptacle with interior walls impervious and resistant to such liquids and, contained within the receptacle, material capable of absorbing such liquids which is comprised of one or more pads of absorbent material, such as paper or other fibrous or filamentary pulp products, aligned in adjacent planes, whereby a plurality of cavities is formed in the container to accept liquid introduced to the container for absorption by the absorbent material.

18 Claims, 3 Drawing Sheets

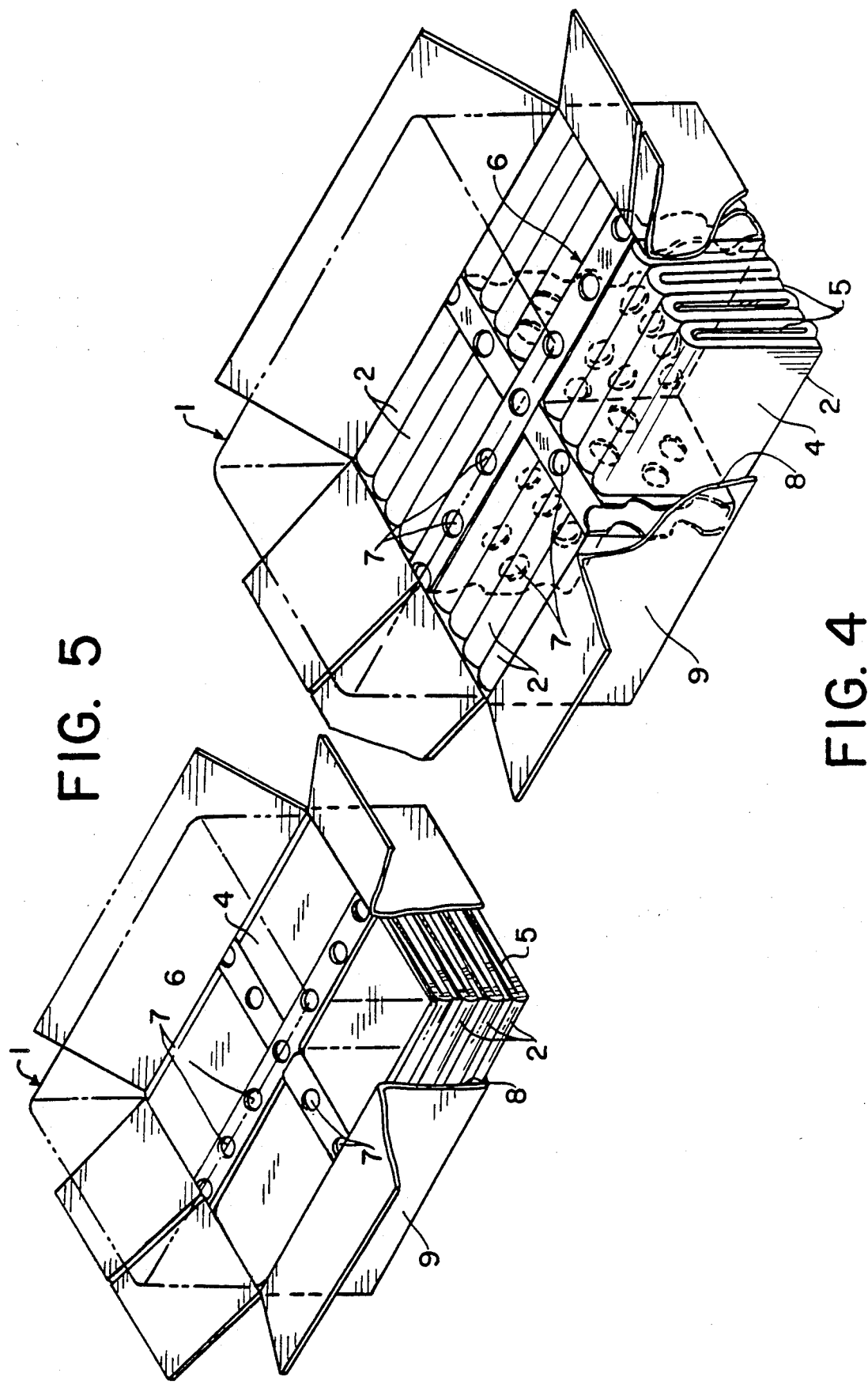

CONTAINER WITH ABSORBENT INTERIOR

BACKGROUND OF THE INVENTION

This invention relates to containers for the storage and disposal of unwanted liquids such as waste oil that has been used in cooking or used engine oil that has been removed from automobiles during changing of the oil.

The disposal of waste oil such as cooking oil which has been used for deep frying, liquid fats, suspended greases and the like in homes and restaurants, or petroleum based lubricants such as engine oil that remains after changing the crankcase or gearbox oil in automobiles, presents several problems.

More specifically, the existence of waste oils in the home, business and industry presents the practical problem of immediate disposal into a container from which the oil will not inconveniently leak or spill on site or in transit to its final disposition. Moreover, if such waste oil is allowed to flow into sewer water, sewer pipes may become clogged producing a foul odor, and cause pollution problems in terms of contamination of rivers and other waterways. Disposal or leakage of waste oil, particularly toxic waste oil, into the soil can result in ground water contamination, among other things.

Therefore, various forms of technology have been proposed to provide a way to dispose of such waste oil.

For example, devices utilizing loose granular forms of absorbents had the problem of the fine particles being dispersed during manufacturing, distribution and usage, which resulted in the device being difficult to handle.

Other methods utilizing granular absorbents enclosed in numerous individual pouches which, although able to absorb waste oil, require substantial time to do so. Therefore, these methods have the fault of waste oil potentially leaking from the container after it is supplied but before it is absorbed by the absorbent material.

Moreover, absorbent materials in filamentary form could not be mechanically placed in the container and had to be manually inserted, which resulted in problems in mass production.

SUMMARY OF THE INVENTION

This invention is designed to solve the problems described above, by providing a waste liquid disposal container which is comprised of absorbent materials in the form of thick pads or mats which can sufficiently absorb such liquids. Preferably, these absorbent materials are in the form of a mat comprised of multiple pads superimposed on one another, having cavities formed between the superimposed absorbent materials to accept the liquid that is supplied to the inside of the container, all of which are enclosed by a receptacle made from material that is non-permeable and resistant to the liquid.

In a disposal container having the structure described above, the placement of the absorbent materials in the pouch during manufacture is easy as the absorbent materials are in the form of pads, which form absorbent mats. In addition, since the absorbent materials are able to sufficiently absorb waste oil and, since cavities are provided between each of the superimposed oil absorbent materials, preferably in the form of multiple, superimposed layers, even if a large volume of waste oil is supplied to the container all at once, the waste oil will be rapidly received within the cavities among the absorbant pads and will be effectively absorbed therefrom by the pads without leakage from the container.

BRIEF DESCRIPTION OF THE DRAWINGS

FIG. 4 is a perspective, partial cut-away of another embodiment of the invention.

FIG. 5 is a perspective, partial cut-away of a variation of the embodiment of FIG. 4.

DETAILED DESCRIPTION OF THE INVENTION

The following provides a description of embodiments of the invention based on the drawings provided.

Figure 2:
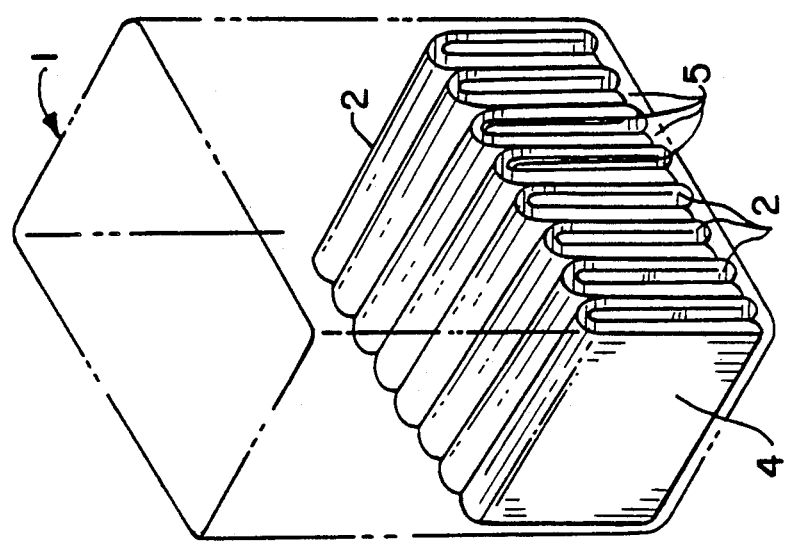
FIG. 2 is a perspective of one embodiment of the container of this invention, having absorbent material contained within a receptacle.

The container of FIG. 2 is comprised of oil absorbent material 2, which is contained in receptacle 1.

Receptacle 1 is made of an oil resistant material that is impervious to oil and other liquids. Therefore, when waste oil is supplied to the inside of the receptacle, such waste oil will not permeate through to the outside. The receptable can be a pouch made from a flexible, polymeric material, and can also have a resealable top (not shown) to facilitate repeated uses. Such resealable opening can be in the known form of interlocking grooves, forming a plastic zipper, or by use of a strip of a resealable adhesive applied on each of the opposing edges of the pouch at the mouth of the receptacle. Examples of materials that can be used for the receptacle include synthetic resins such as polyethylene, vinyl, and resin-laminated paper.

Figure 1:
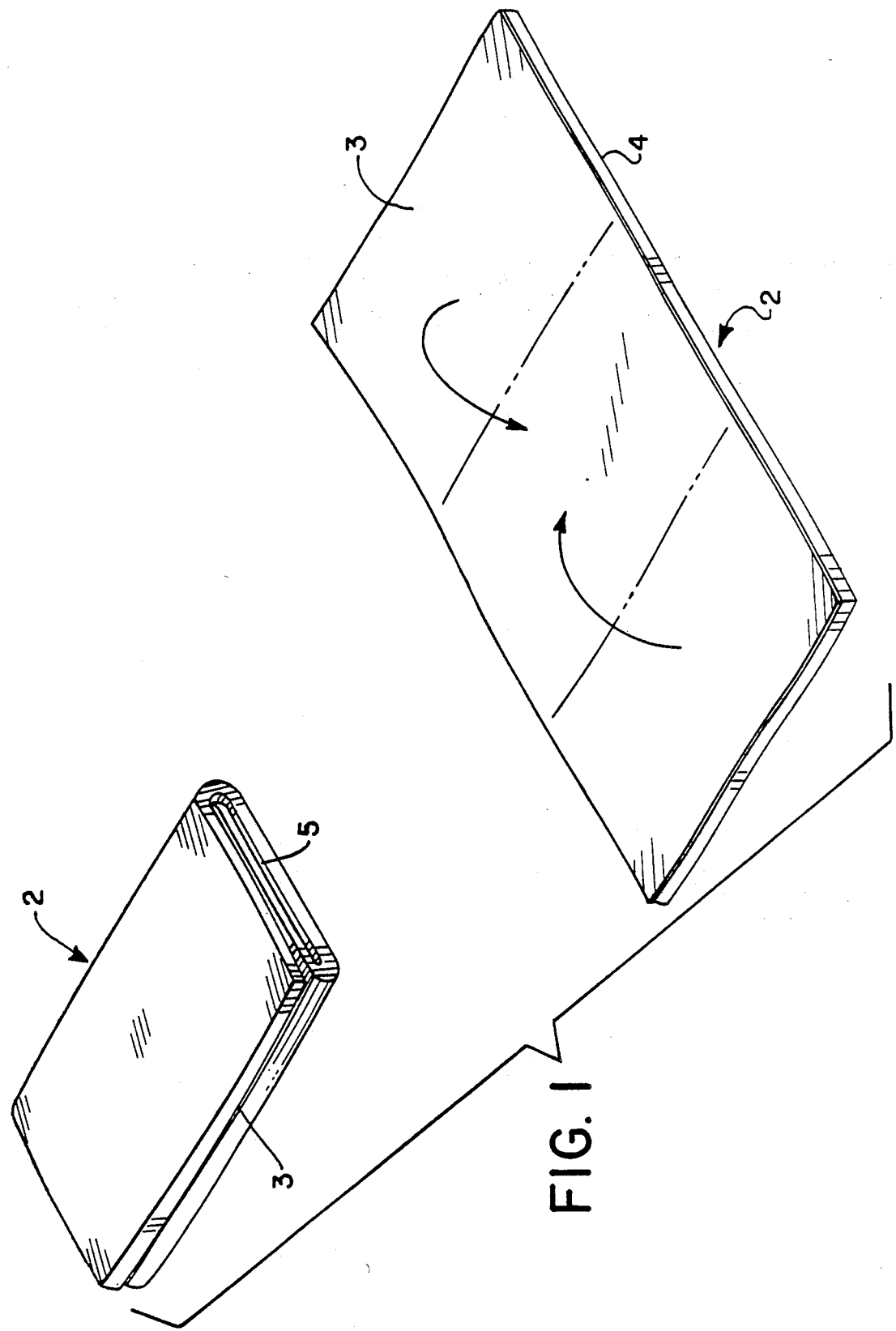
FIG. 1 is a perspective of an example of the absorbent material for use in this invention, first folded and then open.

Oil absorbent material 2 is, preferably, made from a material which is sufficiently able to absorb oil and is in the form of one or more thick mats. The absorbent pads used to form these mats of absorbent material are shown in FIG. 1. Filamentary pulp 4, which is obtained from finely crushed particles of old paper and pulp, etc., made primarily from recycled waste paper, is laminated in the form of a pad by mechanical means and bonded onto a thin oil absorbent sheet 3, which is made from a material such as paper or nonwoven fabric. This flexible, laminated structure is then folded over several times upon itself, as shown at the top of FIG. 1.

Absorbent material 2 is contained in receptacle 1 in the form of a multiple number of pads superimposed on each other, as shown in FIG. 2. Cavities 5, which are formed between the mats of oil absorbent material 2, initially contain the waste oil when it is supplied to the inside of receptacle 1.

Figure 3:
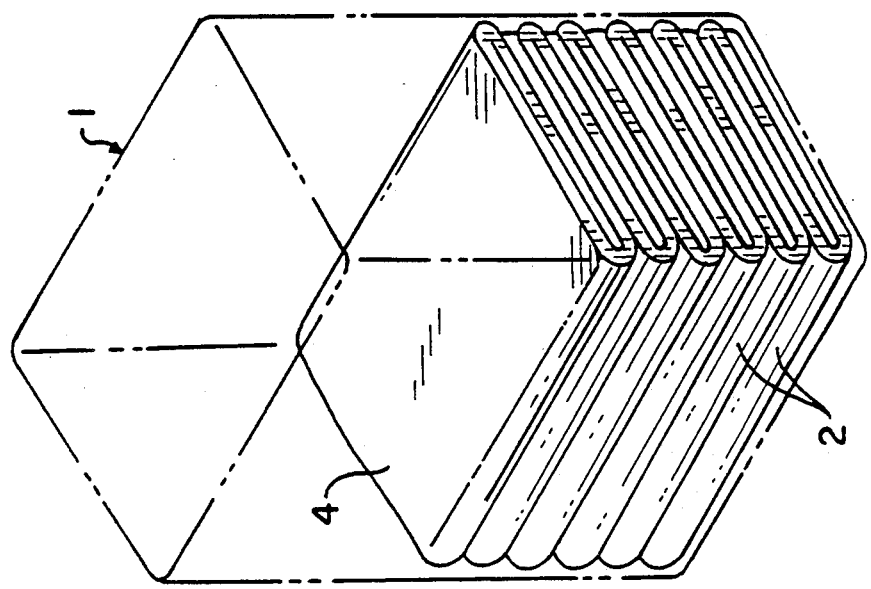
FIG. 3 is a perspective of a variation of the embodiment of FIG. 2.

Absorbent material 2 is shown in FIGS. 2 and 3 in the form of thick mats formed by the folding of the pads of thin layers of filamentary pulp 2, laminated onto oil absorbent sheets 3. Multiple absorbent materials 2 may be horizontally superimposed on each other as shown in FIG. 2, vertically superimposed on each other as shown in FIG. 3 or otherwise configured in abutting or parallel relationship to one another. The mat of absorbent materials 2 may also be comprised of a single, long pad of absorbent materials 2, folded several times upon itself, or may be made from several single sheets of absorbent material 2 placed adjacent to one another in the receptacle 1. In the latter case, the single sheets of absorbent material 2 may be formed in different lengths which are alternately placed adjacent to one another to form cavities similar to the cavities 5 formed by the folds in absorbent material 2, as shown in FIGS. 2 and 3.

When waste oil or other liquid is introduced into receptable 1, a portion of such liquid is directly absorbed by absorbent material 2 and the remaining portion of such liquid, which cannot be immediately absorbed, enters along the inside surface of receptacle 1 and becomes contained in cavities 5. The liquid contained in cavities 5 is gradually absorbed by absorbent materials 2, avoiding leakage or spillage thereof from receptacle 1 which might otherwise occur if the structure of the container permitted the introduced liquid to remain at or near the opening of the receptacle.

In FIGS. 4 and 5, a containment frame 6 is provided in the interior of receptacle 1 which serves to stabilize oil absorbent material 2 and the container during manufacturing, distribution and use. The structure of the containment frame, particularly openings 7, also allows a large volume of waste oil to be introduced into the container at once, which has the advantages previously discussed.

The containment frame 6 shown in FIGS. 4 and 5 has a hollow structure in which flow-through openings 7 are formed in the top and sides. Such flow-through openings may be of any shape or configuration or, alternatively, the containment frame may be in the form of a net-like or other structure which does not prohibit the flow of liquid therethrough. Containment frame 6 also serves to surround and maintain absorbent material 2 in the preferred configuration of superimposed layers.

This structure of a containment frame enables the remaining portion of such liquid not directly absorbed by absorbent material 2 to penetrate into the hollow portion through the flow-through openings on the upper surface of containment frame 6, where it is then stored. Moreover, liquid is also absorbed by absorbent material 2 or trapped in cavities 5, after passing through the openings 7 on the lateral surfaces of containment frame 6.

When absorbent material 2 extends above the upper surface of containment frame 6, it can obstruct the flow-through sections on the upper surface of containment frame 6, making it difficult for liquid to penetrate into the hollow areas. In addition, if the upper surface of absorbent material 2 does not reach to the upper surface of containment frame 6, the flowthrough openings of the lateral surfaces of containment frame 6, which are located above absorbent material 2, lose their significance. Therefore, it is preferred that the upper surface of absorbent material 2 and the upper surface of containment frame 6 be at nearly the same height.

As shown in FIGS. 4 and 5, containment frame 6 is provided in the form of a crossing structure, forming four sections 8. When absorbent material 2 is placed in the sections 8 that are formed by this crossing structure of containment frame 6, effective absorption of waste liquid can be achieved. A multiple number of absorbent materials can be either horizontally superimposed on one another, as shown in FIG. 4, or vertically superimposed on one another, as shown in FIG. 5.

A box 9 is shown in FIGS. 4 and 5 which, if receptacle 1 is a pouch or otherwise made of a flexible material, stabilizes receptacle 1 and prevents it from being tipped over and having its contents spilled out.

Waste oil can be absorbed with substantially enhanced efficacy as a result of using a multiple number of the above mats and mechanically folding them over two or three times on top of each other to form a structure in which the mats are superimposed on top of each other, thereby forming cavities between the folded mats of the absorbent material, even if a large volume of waste oil is supplied all at once into the pouch. The surface area on which oil is absorbed is increased due to the waste oil being stored in the above cavities, and the absorption efficiency of the container is thereby greatly improved. This results in effective absorption of waste oil without any leakage of waste oil from the receptacle and, in some embodiments, also without great risk of tipping over of the container after the waste liquid has been supplied.

Therefore, this invention has a high degree of practical value for reasons that include ease of disposal of waste oil, avoidance of problems relating to environmental pollution, and a simple having the capability of being mass produced at a low cost.

It will be understood that the invention is not limited to the preferred illustrations and embodiments described above, but also encompasses the subject matter delineated by the following claims and all equivalents thereof.

I claim:

1. A container for liquids comprising a receptable adapted for the storage and disposal of the liquids and, contained within the receptacle, pads of absorbent material which form a plurality of cavities available to accept liquid prior to absorbtion thereof by the absorbent material upon introduction of liquid into the container, the cavities further increasing the capacity of the container to receive liquid beyond the amount of liquid fully absorbable by the absorbent material.

2. A container according to claim 1 wherein the receptacle is made from material which is oil resistant.

3. A container according to claim 2 wherein the absorbent material is capable of absorbing oils.

4. A container according to claim 3 wherein the absorbent material is comprised of paper products or other filamentary or fibrous pulp.

5. A container according to claim 1 wherein the pads of absorbent material are aligned in adjacent planes.

6. A container according to claim 5 wherein the absorbent material is formed in pads which are folded upon themselves and placed adjacent to one another to form mats.

7. A container according to claim 5 wherein the absorbent material is formed in single sheets and placed adjacent to one another to form mats.

8. A container for the storage and disposal of oils comprising a receptacle having interior walls which are impervious and resistant to oil and, contained within the receptacle, pads of oil absorbent material which form a plurality of cavities available to accept oil prior to absorption thereof by the absorbent material upon introduction of oil into the container, the cavities further increasing the capacity of the container to receive oil beyond the amount of oil fully absorbable by the absorbent material.

9. A container according to claim 8 wherein the cavities are formed at the edges of the absorbent material.

10. A container according to claim 9 wherein pads of the absorbent materials are folded and the cavities are formed at the points where the folds and ends of the pads of absorbent material adjoin the walls of the receptacle.

11. A container according to claim 9 wherein the absorbent material is comprised of individual unfolded sheets of more than one length and the cavities are formed at the point where the edges of the sheets having different lengths adjoin the walls of the receptacle.

12. A container according to claim 8 wherein the cavities are formed between the pads of absorbent material.

13. A container for the storage and disposal of liquids comprising:

a receptacle having interior walls which are impervious and resistant to such liquids, one or more pads of absorbent material contained within the receptacle and aligned in adjacent planes, a plurality of cavities distributed in the container and configured to accept liquids introduced into the container for absorbtion by the absorbent material, and a frame located inside the receptacle which separates the pads of absorbent material.

14. A container according to claim 13 wherein the frame has openings to accept liquid introduced to the container for absorption by the absorbent material.

15. A container according to claim 14 wherein the frame has openings which permit the flow of liquid between the sections.

16. A container according to claim 13 wherein the frame provides support to the container and substantially maintains the position and configuration of the absorbent material.

17. A container according to claim 13 further comprising an exterior frame which provides support to or maintains the configuration or position of the container.

18. A container for the storage and disposal of oils comprising a receptacle having interior walls impervious to oil and, contained within the receptacle, pads of oil absorbent material of differing lengths which form a plurality of cavities where the edges of the pads adjoin the walls of the receptacle, which cavities are available to accept oil prior to absorption thereof by the absorbent material upon introduction of oil into the container, the cavities further increasing the capacity of the container to receive oil beyond the amount of oil fully absorbable by the absorbent material.

* * * * *